United States Patent

Pelster et al.

[15] 3,677,174

[45] July 18, 1972

[54] DEEP FAT FRYING EQUIPMENT AND METHOD OF USE

[72] Inventors: Arthur F. Pelster; Donald D. Modglin, both of Nashville, Tenn.

[73] Assignee: Kentucky Fried Chicken Corporation

[22] Filed: Dec. 10, 1970

[21] Appl. No.: 96,790

[52] U.S. Cl. ...........................................99/417, 107/55 C
[51] Int. Cl. ......................................................A47j 37/12
[58] Field of Search....................99/417, 403, 416, 418, 336, 99/447, 326, 328, 329, 334; 220/23.83, 18, DIG. 27, 3.1; 107/55 C, 55 D, 55 R, 58

[56] References Cited

UNITED STATES PATENTS

| | | | |
|---|---|---|---|
| 2,244,193 | 6/1941 | Guyon et al. | 99/403 X |
| 3,431,834 | 3/1969 | Keathley et al. | 99/336 |
| 496,436 | 5/1893 | Nichols | 220/3.1 X |
| 3,466,997 | 9/1969 | Hartzog | 99/336 X |

*Primary Examiner*—Leon G. Machlin
*Attorney*—Watson, Leavenworth & Kelton

[57] ABSTRACT

Equipment for and method of use of a closed, pressurized cooking system for deep fat frying of moisture-containing foods, e.g., chicken parts, which includes a cooker having a closable steam-tight cooking chamber to contain a pool of hot liquefied fat of predetermined depth. This cooker is adapted to have removably immersed therein a plural-tiered support rack which has a series of vertically spaced supporting devices removably to carry respectively a stack of food-loaded racks. The invention provides in combination therewith at least one substantially closed, substitute tank of relatively high heat transfer character, such as aluminum, and equipped with an upwardly extending, filler standpipe having an open top end to extend above the level of the surface of the pool, for delivery into the tank chamber of a quantity of water and for venting therefrom steam to which the water is converted during the cooking procedure. The weight of the standpipe-equipped tank and its contained water approximates the weight of a normally food-loaded shelf rack for which it is substituted with the rate of venting of the steam approximating that from the food carried by this shelf rack should the latter be supported in the stack rather than the substitute water-containing tank.

A group of such water-containing substitute tanks are provided to occupy the positions in the plural-tiered support rack of the stack of food-loaded shelf racks except the bottom position which is at least always occupied during each cooking cycle by one of the food-loaded shelf racks.

8 Claims, 6 Drawing Figures

Patented July 18, 1972  3,677,174

DEEP FAT FRYING EQUIPMENT AND METHOD OF USE

BACKGROUND OF THE INVENTION

The present invention relates to pressurized cooking systems which include closable, deep fat frying cooker chambers for containing pools of hot liquefied fat or oil in which moisture-containing foods are to be immersed for the cooking thereof.

Prior to the present invention there has been proposed for such cooking systems a variety of types of cooker structures, such as those disclosed in Keathley et al. U.S. Pat. No. 3,431,834 of Mar. 11, 1969; Hartzog U.S. Pat. No. 3,466,997 of Sept. 16, 1969; and the copending Pelster et al. U.S. application Ser. No. 830,844 of June 5, 1969, now U.S. Pat. No. 3,608,472 of Sept. 28, 1971. All of these propose supporting above the cooking pot chamber a plural-tiered support rack which is designed removably to support therein a stack of trays or shelf racks with each of the latter intended to carry a load of uncooked moisture-containing food, such as distributed chicken parts. The identified Pelster et al. application recognizes the need of making provision for operating the cooking system with less than a full complement of the food-loaded shelf racks, but proposes as the solution an adjustment of the depth of the hot fat that is pooled in the cooker chamber. Thus when the amount of chicken parts to be cooked will occupy only one or a few of the food-loaded shelf racks required for a full complement thereof, and such are mounted in lower positions of the plural-tiered support rack, they will be just immersed in the shallower pool of hot cooking fat upon complete lowering of this support rack into the cooker chamber. This adjustment of the pool depth does not take into account the fact that a pre-set cooking cycle time period, which is predetermined for a full complement of the food load may not produce from such a partial load the same desired quality of cooked product. None of these prior art disclosures addresses itself to a reliable solution of such a problem, leaving it to the exercise of the judgment of the operators.

The present invention efficiently solves this problem in a simple and reliable manner, while eliminating the need for practice of high skill by such operators or acceptance of the non-uniform quality of the products they are likely to produce.

SUMMARY OF THE INVENTION

Embodiments of the present invention attain the desired ends by utilizing substitute units for such of the food-loaded shelf racks that are to be omitted from the plural-tiered support rack because of a lack of demand at any particular time of a full complement of the cooked food producible by the cooking system with maintenance of the same conditions of control. Each of substitute units has a weight substantially equal to the average weight of one of the food-loaded shelf racks and controllably delivers at a similar rate of flow an amount of water vapor or steam which simulates that from the average shelf rack load of food during cooking thereof. Thus, with each such omitted food-loaded shelf rack having substituted therefor such a substitute unit approximately the same time-temperature curve during a cooking cycle as that for a fully food loaded plural-tiered support rack is attained.

Each of these substitute units is in the form of a substantially closed tank having at least some of its wall formed of relatively high heat transfer character, with the chamber thereof containing a certain amount of water. This substitute tank is equipped with an upwardly extending filler standpipe having an open top end to extend above the level of the surface of the hot fat or oil is or will be pooled in the cooking chamber. The interior of this standpipe communicates with the tank chamber to deliver thereinto the required quantity of water before the tank is mounted in the plural-tiered support rack and for venting from the tank chamber the water vapor or steam to which the contained water is converted during the cooking procedure. The degree of the upward extension of the standpipe is such as to prevent the hot cooking oil that is pooled in the cooking chamber from spilling down into the tank chamber when the plural-tiered support rack and such substitute tank or tanks carried thereby are immersed in this oil.

A group of such water-containing substitute tanks preferably are provided to occupy the positions in the plural-tiered support rack of the stack of food-loaded shelf racks except the bottom position which is at least always occupied during each cooking cycle by one of the food-loaded shelf racks.

While it may be desirable to construct the bodies of the tanks of the plural group thereof, for mounting in a certain plural-tiered support rack, in similar design, shape and size for economy in construction, this is not essential to attainment of the desired result in the use of one or more thereof in any particular cooking equipment during any certain cooking procedure period. Since all of these tanks contain the same amount of water, e.g., about 12 to 13 percent of the total capacity of one of such tanks, reasonable variants in the sizes of the tanks, the walls of which are to be exposed to direct contact with the hot fat or oil bath in which the filled plural-tiered rack is immersed, have no appreciable bearing upon the rate of flow of steam emanating from their filler standpipes. But the dimensions of the passage through the filler standpipe of each tank is to be such as to avoid an excessive choking of the flow of steam therefrom under the cooking conditions prevailing or, conversely, a too rapid release of the steam so that all of the tank-contained water is converted to steam which is released appreciably before the termination of the cooking period. The approximate dimensions of the steam venting passage of a particular one of these tanks in a particular cooker during a certain intended cooking period should be such as progressively to convert all of the tank-contained water to vapor which is delivered gradually into the closed cooker chamber substantially throughout the cooking period.

The total surface area of the walls of each tank and its standpipe as are exposed to contact of the hot oil and the heat transfer characteristic of these walls should be such that the cooling effect thereof and of the water in the tank chamber upon the hot oil bath in which they are immersed for the cooking procedure should be generally equivalent to that of one shelf rack, that is intended for use in a particular cooker which is to be equipped with the present invention, and the normal food load to be placed on this shelf rack, such as the normally distributed parts of four chickens of a standardized net weight of about 2¼–2½ lbs. In simpler terms, the hot-oil contacted area of such of the walls of each such substitute tank and its standpipe that have good heat transference should have a heat transfer characteristic in a particular cooker approximating that of the shelf rack and its food load, for example, the normally distributed parts of four such chickens, for which this tank is to be substituted. Also, the substitute tank and its contained water should have a combined weight substantially equal to the combined weight of the shelf rack and the normal load of chicken parts to be arranged thereon.

By way of example, assume that the group of tanks have been designed for substitution of food supporting shelf racks in some of the tiers of a plural-tiered support rack, for immersion in a hot oil bath within the closed chamber of a chicken parts cooker. This cooker can be of the batch type in which the closed cooking chamber contains a pool of oil that is confined and heated therein, or a cook pot in a recirculating system wherein the oil is heated in the system exterior of the closed cooking pot chamber and continuously circulated through the latter with pooling therein during a cooking cycle. The plural-tiered support rack may be suspended in the cooking chamber without the aid of the closure lid of the latter, or suspended from this lid for lowering into the chamber and lift thereoutof by lowering and lifting of the lid. Let it also be assumed that each tier of the support rack is designed removably to support a shelf rack carrying the normally distributed parts of four chickens with those of each chicken weighing about 2¼ to 2½ lbs. Since chicken parts contain about 10 percent of moisture the water content of the shelf rack load would be about 0.9 to 1.0 lb., or about 1 pint which has a bulk of 28.875 cu. in. Accordingly, one pint of water will be poured through the filler standpipe of each of these tanks into the chamber of the latter. As will be indicated later, in a preferred form of these tanks for a certain service the tank chamber capacity may be about 231 cu. in. and thus the pint of added water will occupy about one-eighth or about 12.5 percent thereof. Such equivalency of each of the water-containing tanks to one of the normally loaded shelf racks assures attainment of about the same time-temperature curve for the operation of a particular cooker when it is loaded with the plural-tiered support rack which carries one or more chicken parts-loaded shelf racks and a number of such water-containing substitute tanks and when loaded with this plural-tiered rack as it supports a full complement of the shelf racks that are all loaded normally with chicken parts.

In order to assure good heat transfer from the hot oil bath to the contained water in the tank chamber and to simplify and realize economy in the construction of each tank and its standpipe, while assuring freedom from risk of contamination of the food being cooked, the use of sheet aluminum for the fabrication thereof may be preferred. However, other suitable materials may be employed for this purpose, such as stainless steel, and, if desired, some parts may be fabricated from low heat transfer material with reliance upon other cooperative parts of relatively high heat transfer character to convert the contained water to steam.

Further, the shapes of the walls of the tanks and their standpipes are not particularly limited by the service to be performed thereby in the practice and use of the present invention. For example, the tanks may be rectangular in shape with flat top walls insofar as their purpose of progressively converting contained water to water vapor or steam and conveying or venting it to a point of escape above the level of the surface of the hot oil bath or pool at a controlled rate is concerned. However, since cooking operations employing such equipment require unloading by manual manipulation from such a plural-tiered support rack of the shelf racks that are loaded with the cooked food or chicken parts and which are mounted below one or more of such substitute tanks, after lift of the plural-tiered support rack out of the hot oil bath, as well as the removal of these tanks, it is important to the safety of the operator that the hazard of burns by drainage of hot oil from off of the tops of the mounted tanks be minimized. Also, drainage of hot oil from the one or more substitute tanks down upon the cooked chicken parts therebelow during the draining period immediately following the lift of the loaded plural-tiered support rack from out of the hot oil bath risks further browning of the cooked food and undesirably loading it with cooling-thickened grease. This minimization and avoidance of these undesirable risks are attained by shaping the top wall of each tank in a manner which facilitates hot oil drainage therefrom directly into the cooking chamber down past the cooked food on shelf racks therebelow. This may be done effectively in a variety of ways.

The tank top wall or panel may be sloped down gradually from a high point at one side of the substitute tank to the opposite side with the latter extending laterally beyond the normal location of chicken parts on shelf racks therebeneath. The tank top wall may have a cross ridge extending from one side of the tank to the opposite side thereof with the sections of this wall which flank the opposite sides of the ridge being sloped downwardly in opposite directions to the remaining pair of tank side edges. In using this latter variant this ridge may extend transversely across from the tank back side to its front side, or it may extend at right angles to such direction from the opposite right and left side edges.

When the cross ridge extends transversely across the top panel, from the back sidewall to the front sidewall, these sidewalls are gabled. It is preferred to mount the filler standpipe of each of these substitute tanks on the gabled back sidewall for easy placement guidance to the operator. The interior of the filler standpipe of each of these tanks is communicated to the tank chamber through this gabled sidewall. In such case the filler standpipes of the group of substitute tanks are staggered, with respect to each other, along the gabled sidewalls thereof so as to avoid interference with each other when a plurality of these tanks are removably mounted in the plural-tiered support rack. Thus the location of the standpipe of any of the tanks of this group may not be located at the top panel cross ridge thereof for direct communication of the shallow pocket in the tank chamber immediately beneath the cross ridge, there to provide a water vapor trap in the use of the tank. But the amount of water that is equivalent to the vapor so trapped is so relatively small as to be inconsequential to the useful service to be performed by each such tank in the operation of the cooker. However, should a practitioner of the invention wish to eliminate such water vapor traps in this group of substitute tanks the locations of the communicating bottom ends of the filler standpipes thereof may determine the locations of the cross ridges of the tanks, whereby these cross ridges of the group of tanks are likewise staggered with respect to each other. The method of setting up such a cooking system for use through a predetermined cooking cycle and the use there-of during the latter constitute a part of this invention.

BRIEF DESCRIPTION OF THE DRAWINGS

Other objects of the invent-on will in part be obvious and will in part appear from reference to the following detailed description taken in connection with the accompanying drawings, wherein like numerals identify similar parts throughout.

DESCRIPTION OF A PREFERRED EMBODIMENT

Figure 1:
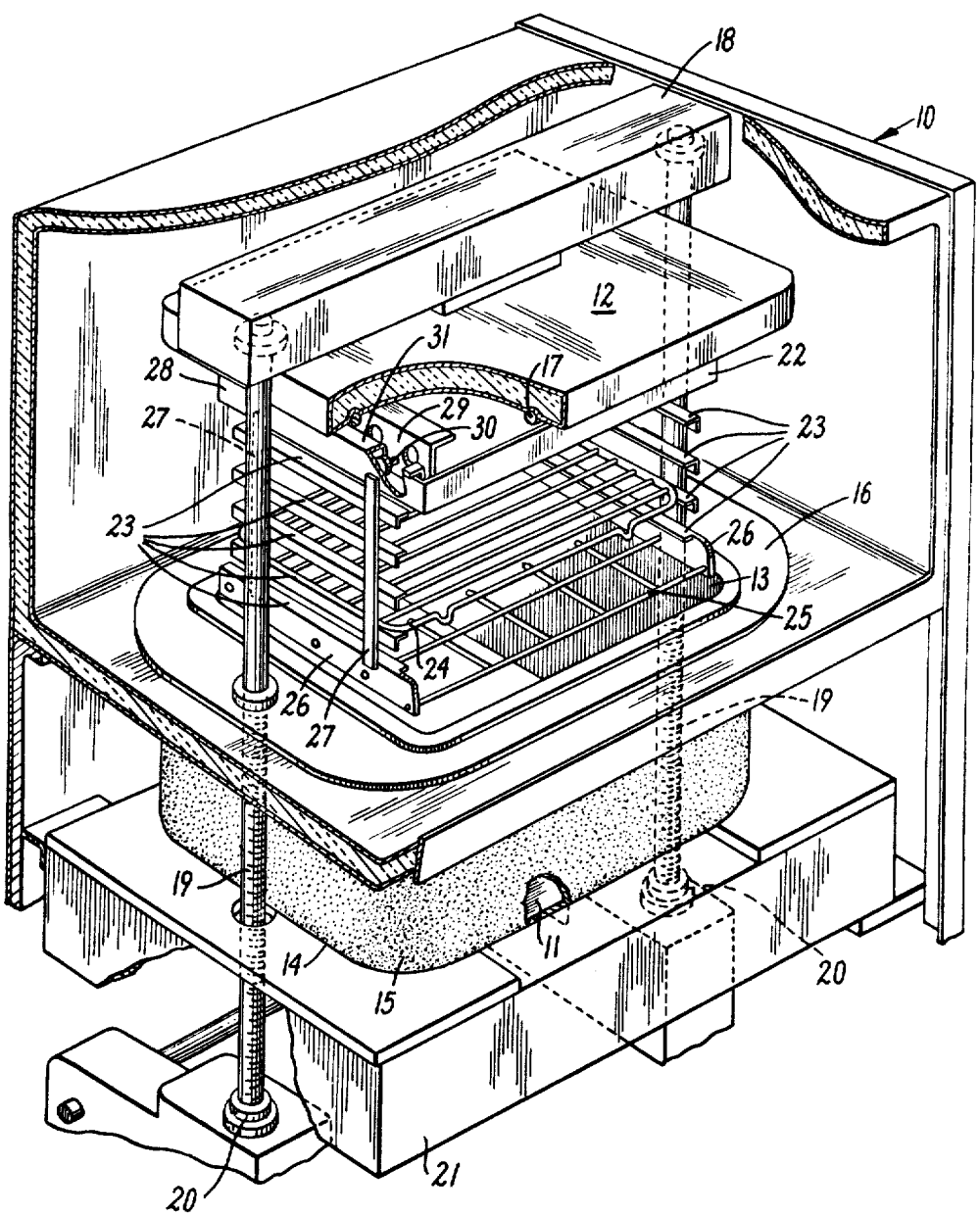
FIG. 1 is a perspective view, with parts broken away and in section, of the physical structure of the cooking pot assembly in which a plurality of the substitute filler tanks of the present invention may be mounted.
Figures 2, 3, 4, 5:
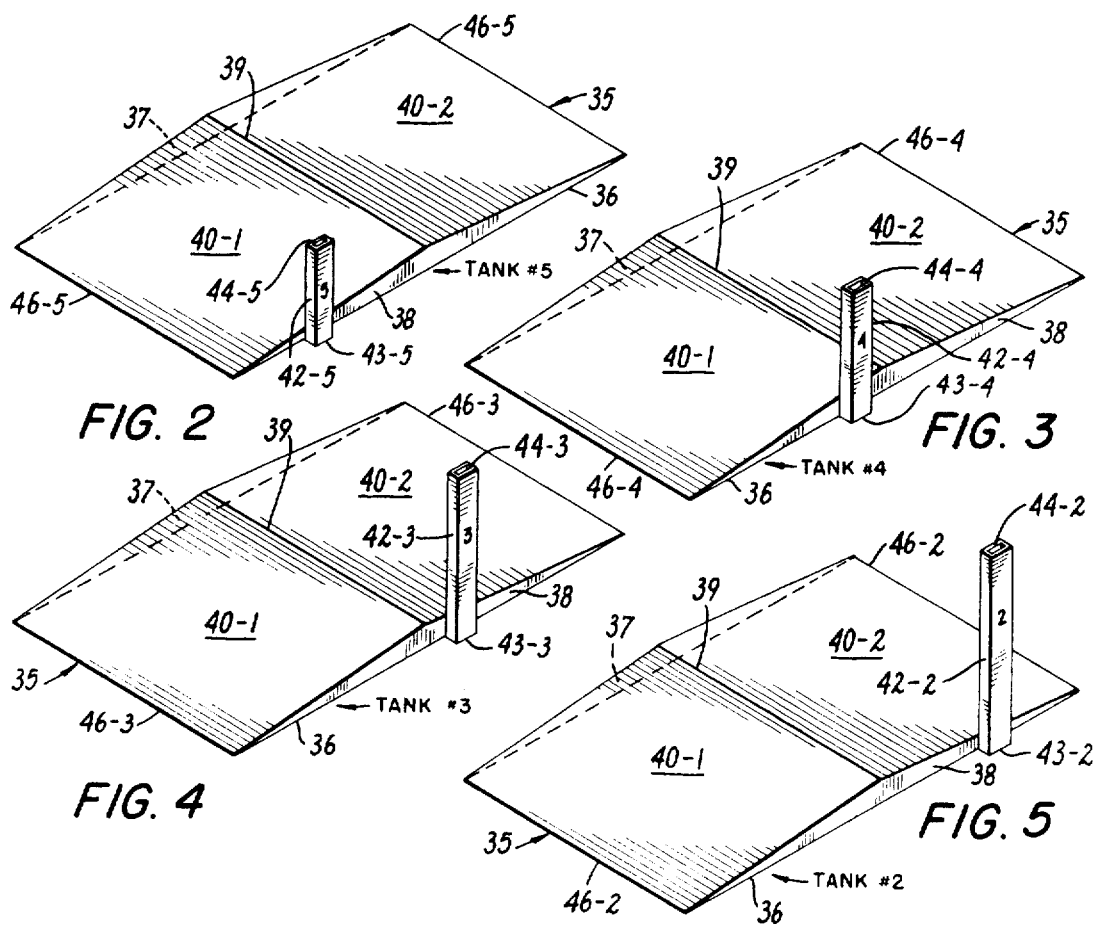
FIGS. 2, 3, 4, and 5 are perspective views of such plurality of the substitute filler tanks, which collectively form a set thereof that are selectively or collectively mounted in the plural-tiered support rack of the FIG. 1 structure.

By way of example, FIG. 1 illustrates the cooking pot assembly 10 of the pressurized cooking system disclosed in the identified Pelster et al. application Ser. No. 830,844 which has been particularly designed for frying chicken parts in hot liquefied fat or shortening and the use of which advantageously may be improved by embodiment therein of the present invention. This cooking pot assembly 10 includes a tank 11 and a removable cover or lid 12, which together define a closable and sealable, isolated cooking chamber 13. The cooking pot 11, which preferably is rectangular in lateral section and made from stainless steel, is provided with a transverse bottom 14 and may be desirably covered with a layer 15 of heat insulation. This cooking pot is provided with an annular lateral rim 16 about its open top against which the bottom face of the lid 12 is to be sealed by a circumscribing sealing ring 17. For removal of the lid 12 from the pot rim 16, in order to load chicken parts into the cooking chamber 13 and remove them therefrom after frying, this lid is preferably supported by a crossbar 18 that is fixed thereto. The ends of the crossbar 18 are suitably supported on or carried by the top ends of a pair of jack screws 19 which are journaled therein. Jack screws 19 are threadably supported within internally threaded and rotatable sleeves 20 carried by a base housing 21. Thus, when the internally threaded sleeves 20 are suitably rotated in one direction they cause downward advance therethrough of the externally threaded jack screws 19 for lowering the crossbar 18 and the lid 12 therewith. Simultaneous rotation of the sleeves 20 in the opposite direction will raise the lid 12 to the open position indicated in FIG. 1.

To the underside of the lid 12 is removably supported a suitable chicken parts supporting rack 22, in the form of a rectangular, plural-tiered and withdrawable structure. As will be seen from FIGS. 1 and 6 the plural-tiered support rack 22 is provided with a plurality of opposed pairs of side brackets or angle bars 23, with each pair thereof constituting a set of supports adapted removably to support the ends of one of a plurality of wire shelf racks 24. The lateral bottom of the plural-tiered rack 22 may be in the form of a wire grid 25 that is supported by a pair of opposed transverse bars 26, and it constitutes a bottom shelf. Vertical end bars 27 at both sides rigidly connect the bottom bars 26, the bracket bars 23 and a crown frame 28 together to define with the wire grid 25 the plural-tiered support rack 22.

The internally threaded sleeves 20 are associated with suitable driving mechanism to rotate them together alternately in opposite directions, such as by means of a reversible electric motor. If desired, these sleeves 20 may be held fixed and the motor and associated drive mechanism may rotate the jack screws 19 to attain the same lid lowering and lifting action.

It is preferred that the bottom side of the lid 12 have fixed thereto a pair of transversely spaced, depending flanges 29, each of which pivotally supports a group of free-running rollers 30. Opposite sides of the crown frame 28 have inverted channels 31 fixed thereto, so that the loaded support rack 22 may be removably attached to the lid 12 by sliding these channels over the two groups of rollers 30. By providing a second such plural-tiered support rack 22 the operator is permitted to load one while the second and its load is immersed during the cooking cycle in the hot cooking bath that is pooled in the pot chamber 13.

As will be more fully explained hereinafter with respect to FIG. 6 such a plural-tiered rack may provide immediately above its fixed bottom wire grid shelf 25 a first position (Pos. 1), and successive sets or pairs of opposed bracket flanges 23 provide a plurality of succeeding, upwardly spaced sets of supports that define therebetween, progressively upward, second, third, fourth and fifth positions (Pos. 2, Pos. 3, Pos. 4, and Pos. 5) for removably supporting shelf trays or racks on which pieces of food or chicken parts are to be carried for deep fat frying thereof. Immediately above each such position such pairs of opposed bracket flanges are designed to support a chicken parts loaded, wire shelf rack 24, and an extra set thereof at the top is intended for support of an empty one of these shelf racks to prevent pieces of chicken on the wire shelf rack at the fifth position from floating to the top of the hot liquefied fat pool during cooking, so that they would not be as thoroughly cooked as those below which were kept immersed in the hot liquefied fat by the shelf racks immediately thereabove.

In the copending Pelster et al. application Ser. No. 830,844, now U.S. Pat. No. 3,608,472, the use of the cooking pot assembly 10 of FIG. 1 is proposed for use in a pressurized cooking system which includes a closed, and isolating, hot fat or shortening recirculating circuit that includes in series this cooking pot assembly; an air-excluding pump; and an air-excluding, through-flow heat exchanger that is exterior of and separated from this cooking pot assembly. It is also proposed therein that such system be equipped for semi-automatic, timer-controlled operation, but it does not disclose an appreciation of the fact that the amount of steam generated during a cooking cycle from a variation in the amount of moisture contained in different sizes of food loads being cooked during different cooking cycles would upset the time-temperature curve that was pre-established for a full food load, nor a simple and desirable solution of this problem. The present invention and use thereof in that system answers that need by providing for each normally food-loaded shelf rack a substitute filler unit which is to be loaded into one of the plural-tiered support rack positions from which is to be omitted a shelf rack carrying a full load of uncooked chicken parts. In order to simplify an operator's use of a plurality of such substitute filler units a set thereof is provided with each designed to be used in a separate one of the plural-tiered support rack positions, and keyed thereto by suitable, placement-guiding, identifying indicia.

Each of these substitute filler units is in the form of a substantially closed tank preferably having its walls formed of a relatively high heat transfer characteristic, such as sheet aluminum, which together define an internal chamber. Into this chamber is poured a quantity of water that is substantially equivalent to the amount of moisture contained by a full load of the chicken parts that are to be carried by each wire shelf rack. Since each wire shelf rack 24 may be a standard unit of the approximate dimensions of 16½ × 25 inches, to nest in a standard bakery bun pan that is 18 × 26 inches, each such substitute filler tank must be of dimensions that will permit it to be supported by each set of the support brackets 23 of the plural-tiered support rack 22, e.g., about 14 × 25 inches. With such a wire rack shelf 24 weighing about 1½ lbs., the 36 chicken parts of the four head of chickens to be distributed thereon having a net weight of about 9–10 lbs., 2¼ to 2½ lbs. per head and about a 10 percent moisture content or about 0.9–1.0 lb., each of the substitute filler tanks with its contained water load may weigh approximately 10½ to about 11 lbs. In other words, there should be approximately a weight equivalency between a shelf rack with its chicken parts load and a filler tank with its water load that is to be substituted for the former.

Each substitute filler tank is equipped with an upwardly extending, filler standpipe having its top end open and of a height as to extend above the level of the surface of the hot fat or shortening that is pooled in the cooking chamber, which level may be maintained constant for successive cooking cycles by virtue of the use of the present filler tanks. The downwardly extending passage provided by the standpipe of each of these filler tanks communicates with tank chamber to deliver thereinto, before use of the tank, the required quantity of water and for controlled venting from this chamber the water vapor or steam to which the contained water progressively is converted during a cooking cycle.

Figure 6:
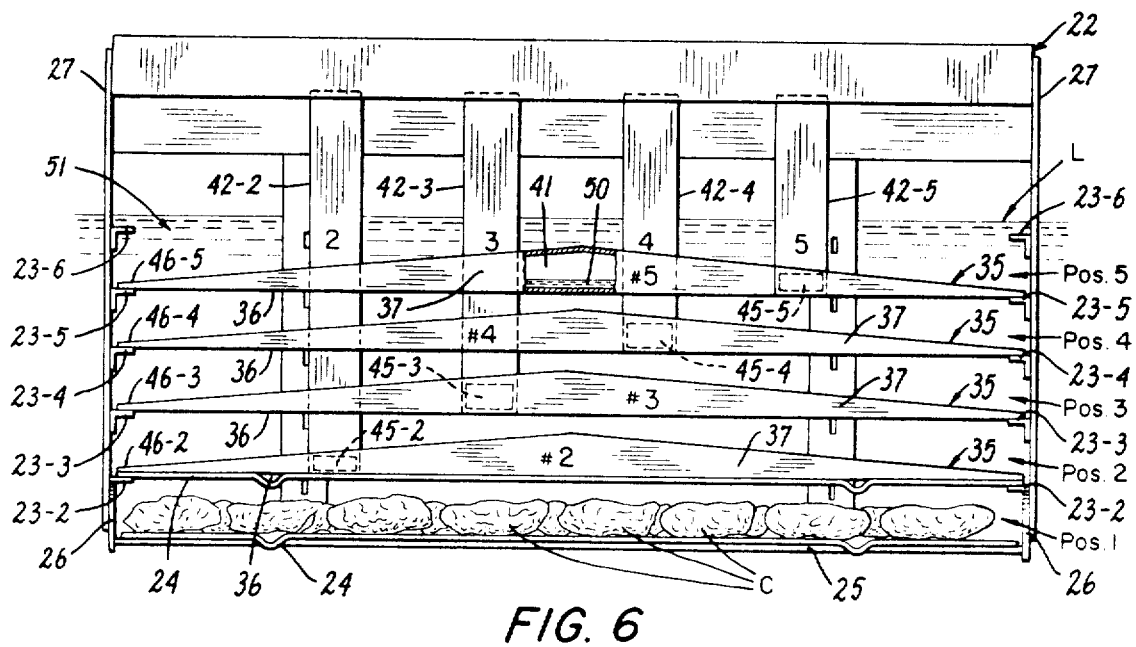
FIG. 6 is a front elevational view to larger scale, with parts broken away and in section, of this plural-tiered support rack, showing it carrying in a first position a wire rack shelf on which a load of distributed chicken parts is borne, and in the second, third, fourth and fifth positions a set of the present substitute filler tanks.

Each of the four substitute filler tanks that are shown in FIGS. 2 to 6 inclusive has a main body 35 which, by way of example, is preferably constructed of 11 gauge sheet aluminum. The bottom wall or panel 36 of each is rectangular and may be 14 inches wide and 25 inches long. The front and back sidewalls, respectively 37 and 38, of each tank body 35 preferably is gabled, as shown, and at their highest medial elevation may be 1⅜ inches high. The top wall of each tank may be a single panel that is medially bent to provide a transverse cross rib 39 which is flanked on opposite sides thereof with similar sloping panel sections 40–1 and 40–2. Sloping of top surfaces of each tank 35, such as those of the top panel sections 40–1 and 40–2, assures that when the plural-tiered support rack 22 and the any such tanks as are carried in any positions thereof are lifted out of the pooled bath of hot liquefied fat or oil, the latter which has gathered on top tank surfaces will quickly run off to the sides. All meeting edges in the joints intervening the bottom panel 36, the gabled front and back sidewalls 37 and 38, and the peaked top panel 40–1 and 40–2 are secured together in fluid-tight junctures which may be formed by continuous welds. Each of the tanks 35 thus has a substantially closed interior chamber 41 (FIG. 6).

The respective standpipes 42–2, 42–3, 42–4 and 42–5 are provided as sections of 1 × 2 inches extruded aluminum tubing with the walls thereof preferably being of similar gauge. The bottom end of each of the tubular standpipe sections is sealed respectively by a transverse aluminum plate 43–2, 43–3, 43–4 and 43–5 that is welded to the standpipe sidewalls in fluid-tight joints, but the respective top ends 44–2, 44–3, 44–4 and 44–5 are left open. Each standpipe is supported by the gabled back sidewall of the tank on which it is mounted, such as by abutting a lower portion of a sidewall of the standpipe to a portion of the tank back sidewall and welding it thereto. These opposed sidewall portions of each of the paired tank and standpipe are provided, before the welding operation, with alignable holes to provide a communicating port between the interior passage of the standpipe and the tank chamber 41, and such intercommunicating ports are located at different positions in the tank sidewalls for a purpose to be explained later. These intercommunicating ports 54–2, 45–3, 45–4 and 45–5 are indicated by dotted lines in FIG. 6. The shapes of those intercommunicating ports is of no particular importance and, if desired, may be dictated by providing the hole in the tank back sidewall as a gap, with a like gap formed in the opposed sidewall of the standpipe.

The cubic capacity of each substitute filler tank chamber 41 is about 231 cu. in., and since the moisture content of the chicken parts to be loaded into the plural-tiered support rack 22 by support upon one of the shelf racks 24 that is to be inserted in one of the second, third, fourth and fifth positions is equivalent to about one pint of water, such amount of water when poured into the chamber of any of the tanks 35 through its standpipe before inserting into the plural-tiered support rack will occupy about one-eighth of the capacity of the chamber and provide therein a depth of water of slightly less than one-tenth of an inch for rapid heating to conversion into steam that is released from the standpipe in regulated progressive fashion under the environmental conditions prevailing in the cooking pot chamber and pressurized recirculating system. Such a shallow layer of water is indicated in exaggerated depth at 50 in the broken out area in FIG. 6, for clarity.

In operation and use of the present invention, let it be assumed that the quantity of cooked chicken parts demanded by sales at any particular time is no more than that which will be satisfied by the thirty-six pieces that may be carried by one wire shelf rack 24. This shelf rack, carrying these chicken parts C, will be inserted in the bottom or first position (Pos. 1) upon the grid bottom shelf 25. The extra empty wire shelf rack which is kept available to superpose the topmost loaded shelf rack, so as to prevent during the cooking procedure the immersed chicken parts thereon from floating to the top of the hot oil bath that is pooled in the cooking pot chamber, indicated at L in FIG. 6, may then be rested upon the set of shelf rack supports 23–2. Then the first substitute filler tank ("-TANK No. 2", and bearing this identifying indicia), having its chamber loaded with one pint of water, is inserted in the second position (Pos. 2), with its opposite side edges 46–2 positioned above the supporting bracket flanges 23–2. The open top end 44–2 of standpipe 42–2 of this tank will extend well above the predetermined level L of the hot fat pooled in the cooking pot chamber upon lowered immersion of the loaded plural tiered rack 22. The third position (Pos. 3) will then have inserted therein the next water-containing, filler tank ("TANK No. 3") with its opposite side edges 46–3 rested upon supporting bracket flanges 23–2, and it will be noted in FIG. 6 that the open top end 44–3 of its shorter standpipe 42–3 will extend up to about the same level of the first standpipe top end 44–2. This procedure is repeated with the next two filler tanks ("TANK No. 4" and "TANK No. 5") with respect to the fourth and fifth positions (Pos. 4 and Pos. 5), and it will be noted that the open top ends 44–4 and 44–5 of their progressively shorter standpipes 42–4 and 42–5 will extend up to about the same level as those of standpipes 42–2 and 42–3, all well above the ultimate elevation of the surface L of the pooled oil bath after immersion therein of the plural-tiered support rack 22 and the loaded shelf racks and filler tanks carried thereby. Since the standpipes 42–2, 42–3, 42–4 and 42–5 of the set of four filler tanks will be substantially aligned transversely in the so-mounted positions of these tanks the positions of these standpipes are staggered laterally to avoid interference with each other. The four substitute filler tanks or their standpipes, or both, are provided with indicia, such as numbers to guide their placement in the successive positions, as shown.

In a certain operative embodiment of the set of four substitute filler tanks Nos. 2, 3, 4, and 5 of FIGS. 1 to 6 inclusive, these respective tanks weigh 9 lbs. 15 oz., 9 lbs. 13 oz., 9 lbs. 11 oz., and 9 lbs. 8 oz. The differences in the weights of these tanks is due to the variations in the heights of their standpipes. Thus, these tanks Nos. 2, 3, 4 and 5 with their respective water loads of 1 pt. each weighed 10 lbs. 15 oz., 10 lbs. 13 oz., 10 lbs. 11 oz. and 10 lbs. 8 oz., which is a reasonable variation, that has been found to be operative in the Pelster et al. Serial No. 830,844, now U.S. Pat. No. 3,608,472, pressurized cooking system, in view of the variation of the total weights of the wire shelf racks with their varying chicken parts loads which may vary from about 10½ lbs. to about 11¼ lbs.

After the plural-tiered support rack 22 is loaded in the manner indicated by way of example in FIG. 6 and it is lowered into the bath 51 of hot oil that is pooled in the cooking pot chamber 13 by lowering of the pot lid 12 for sealing this chamber closed, the chicken parts C that are carried on the lower shelf rack 24 in Pos. 1 are suitably cooked during the pre-set cooking cycle. During this cooking period, a predetermined amount of the moisture contained in these chicken parts is vaporized into the closed hot oil recirculating system, and at the same time a substantially similar quantity of steam is delivered there into from each of the substitute filler tanks Nos. 2, 3, 4 and 5, so that the pre-set timer mechanism will dictate substantially the same characteristic operation of the pressurized cooking system during the so-determined cooking cycle as would be obtained if all of the positions (Pos. 2, Pos. 3, Pos. 4 and Pos. 5) were occupied by similar food-loaded shelf racks.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is the novel subjects matter defined in the following claims.

1. In a closed, pressurized cooking system for deep fat frying of uncooked moisture-containing foods, such as chicken parts, comprising a cooking pot having a closable, steam-tight cooking chamber containing a pool of hot liquefied fat of predetermined depth conventionally to receive therein a plural-tiered, withdrawable, support rack for complete immersion of a plurality of removable, food-loaded shelf racks stacked therein and with the pool surface located at a certain elevation upon such immersion, said plural-tiered rack having a plurality of upwardly spaced sets of supports with each set adapted removably to support one of said food-loaded shelf racks and with at least one of the latter so supported in said support rack, the combination therewith before the commencement of a cooking cycle of
   1. at least one of a plurality of substantially closed tanks each having at least some of its walls formed of material of relatively high heat transfer characteristic and with its walls together defining an internal chamber containing a predetermined quantity of water, one of said water-containing tanks being removably supported by each of said sets of supports from which one of said food-loaded racks is omitted, and
   2. an open top, filler standpipe having its interior in communication with said tank chamber and its top extending upwardly to a point where the latter will be above the pool surface elevation in the submerged position of said tank when said plural-tiered rack is immersed in the hot pool for commencement of a cooking cycle and to serve as a delivery outlet above the pool surface for steam generated in said tank chamber during a pre-set cooking cycle with said cooking pot chamber closed,
   3. the weight of said water-containing tank and its standpipe approximating the weight of a normally food-loaded shelf rack for which it is substituted with the delivery of generated steam from the standpipe during a cooking cycle approximating that from the food load intended to be carried by this shelf rack during the cooking cycle when supported on this same set of supports instead of said tank.

2. The pressurized cooking system combination defined in claim 1 characterized by all of the walls of said tank being formed of relatively high heat transfer metal.

3. The pressurized cooking system combination defined in claim 1 characterized by said tank having a unitary laterally extending top wall that is sloped downwardly to at least one tank side so as to facilitate drainage of the liquefied fat thereoff past any food load supported therebelow as said plural-tiered rack is withdrawn from the pool.

4. A substantially closed, rectangular tank for containing a predetermined quantity of water to be converted into steam for delivery during a food cooking cycle into a closed, pressurized cooking system that includes a cooking pot having a closable, steam-tight cooking chamber which is adapted to contain a pool of hot liquefied fat of predetermined depth with said pot chamber being adapted to receive therein a withdrawable support rack which will removably carry a shelf rack loaded with a normal quantity of uncooked moisture-containing food, such as chicken parts, for immersion of the food-loaded shelf rack into the pool with the surface of the latter at a certain elevation, said tank having an internal chamber defined by walls with at least some thereof being formed of relatively high heat transfer material, an open top filler standpipe having its interior in communication with said tank chamber and its top extending upwardly to be above the intended pool surface elevation when said tank is substituted for such food-loaded shelf rack and is in submerged position with the support rack in the pool and to serve as a delivery outlet for steam generated in said tank chamber during a cooking cycle with said cooking pot chamber closed, said tank having a laterally extending top wall provided with a cross ridge extending from one side of the tank to the opposite side thereof with the sections of said top wall which flank the opposite sides of the ridge being sloped downwardly in opposite directions to the remaining pair of tank sides.

5. The standpipe-equipped tank as defined in claim 4 characterized by said tank sides between which the ridge extends being gabled sidewalls with said standpipe being supported by one of said gabled sidewalls and with the interior of said standpipe being communicated to the tank chamber through this supporting sidewall.

6. In a closed pressurized cooking system for deep fat frying of uncooked moisture-containing foods, such as chicken parts, comprising a cooking pot having a closable, steam-tight cooking chamber adapted to contain a pool of hot liquefied fat of predetermined depth to receive therein a plural-tiered, withdrawable, support rack for complete immersion of a plurality of removable, food-loaded shelf racks stacked therein and with the pool surface located at a certain elevation upon such immersion, said plural-tiered rack having a certain number of upwardly-spaced sets of supports with each set adapted removably to support one of said food-loaded shelf racks with these sets defining a bottom first position and successive positions thereabove, the combination therewith of 1. a plurality of substantially closed tanks that is at least one less than the number of sets of the shelf rack supports and with each tank being respectively designed to be mounted only on one of the sets of shelf rack supports at one of the successive positions above the bottom first position, each of said tanks having at least some of its walls formed of material having a relatively high heat transfer characteristic and with its walls together defining an internal chamber adapted to contain a predetermined quantity of water, 2. each of said tanks being provided with an open top, filler standpipe having its interior in communication with said tank chamber and its top extending upwardly to be above the intended pool surface elevation when supported in said plural-tiered rack and submerged with the latter in the pool, the intended position of each tank being determined by the height of its standpipe whereby said tanks respectively may occupy intended ones of the positions above the bottom first position with their standpipes extending up to approximately the same level above the pool surface elevation, said standpipes of said tanks being connected to said tanks along the same sides thereof in staggered fashion so as to avoid mutual interference when all of said tanks are supported by said plural-tiered rack at their respective intended positions, and 3. the predetermined quantity of water to be provided in the chamber of any certain one of said plurality of tanks before its use of substitution for a normally food-loaded shelf rack in the position of said plural-tiered support rack intended for this tank being the quantity by weight which when combined with the weight of this tank and its standpipe approximates the weight of such food-loaded shelf rack whereby the rate and amount of heat absorption from the hot oil when this water-containing tank is immersed therein throughout the cooking cycle approximates that of such food-loaded shelf rack when the latter is so immersed for delivery into the system of generated steam from this tank's standpipe approximating that from the food load carried by such shelf rack if in the same position during the cooking cycle.

7. The pressurized cooking system combination defined in claim 6 in which said plural-tiered rack is provided with five sets of said shelf rack supports to define five shelf rack positions with the bottom first position intended always to support a food-loaded shelf rack during all cooking procedures, the number of said tanks being four respectively to occupy the second, third, fourth and fifth positions sets of shelf racks successively arranged above the first position, said tanks being successively substitutable for unloaded shelf racks from the top downward whereby said plural-tiered rack has all of its positions filled with food-loaded racks in successive lower positions and tanks in successive upper positions.

8. The method of deep fat frying a load of moisture-containing food, such as a conventional number of uncooked chicken parts containing a normal quantity of moisture, in a closed, pressurized cooking system which comprises a cooking pot having a closable, steam-tight cooking chamber containing a pool of hot liquefied fat of predetermined depth in which is immersed at the beginning of a food cooking cycle a plural-tiered, support rack having a plurality of upwardly spaced sets of supports with at least one of said sets supporting one of a plurality of shelf racks which carries a normal load of such food, inserting into each of the remainder of the upwardly spaced sets of supports which does not support one such food-loaded shelf rack a water-containing closed tank whereby a modified full stack complement of food-loaded shelf racks and water-containing tanks is mounted in all positions of the sets of supports of said plural-tiered support rack, each such closed tank having walls defining an internal chamber and an open top filler standpipe with the interior of the latter communicating to the tank chamber, at least some of these tank walls being formed of relatively high heat transfer material and the chamber containing a predetermined quantity of water with the weight of this water-containing tank approximating the weight of a normally food-loaded shelf rack for which it is substituted whereby the rate and amount of heat absorption from the hot oil when this water-containing tank is immersed therein for a period of time approximates that of such food-loaded shelf rack when the latter is so immersed for the same time period, such water-containing tanks and food-loaded shelf racks constituting together a full stack complement thereof in all positions of the sets of supports of said plural-tiered support rack, predetermining the time period of a cooking cycle and the temperature of the cooking oil on the basis of a complete complement of the normally food-loaded shelf racks in a standard stack, immersing the plural-tiered support rack and its modified supported stack in the pool of hot oil with the top end of each of the tank's standpipes extending above the pool surface, closing the cooking pot chamber and initiating the cooking cycle for termination at the end of the predetermined cooking cycle period with delivery of generated steam from each such tank standpipe during the cooking cycle which approximates during the latter that from the normal food load intended to be carried by the shelf rack for which such water-containing tank is substituted.

* * * * *